United States Patent [19]
Tanaka et al.

[11] Patent Number: 5,794,020
[45] Date of Patent: Aug. 11, 1998

[54] DATA TRANSFER APPARATUS FETCHING RECEPTION DATA AT MAXIMUM MARGIN OF TIMING

[75] Inventors: Akira Tanaka, Isehara; Toshio Doi, Kodaira; Kenichi Ishibashi, Kokubunji; Takehisa Hayashi, Sagamihara; Akira Yamagiwa, Kanagawa-ken, all of Japan

[73] Assignee: Hitachi, Ltd., Tokyo, Japan

[21] Appl. No.: 663,982

[22] Filed: Jun. 14, 1996

[30] Foreign Application Priority Data

Jun. 16, 1995 [JP] Japan .................. 7-149977

[51] Int. Cl.$^6$ ............................................. H04L 7/00
[52] U.S. Cl. ............................... 395/552; 595/881
[58] Field of Search ........................... 395/552, 878, 395/880, 881

[56] References Cited

U.S. PATENT DOCUMENTS

| | | | |
|---|---|---|---|
| 3,737,637 | 6/1973 | Frankeny et al. | 371/28 |
| 5,544,203 | 8/1996 | Casasanta et al. | 375/376 |
| 5,552,726 | 9/1996 | Wichman et al. | 327/149 |
| 5,636,254 | 6/1997 | Hase et al. | 375/371 |

FOREIGN PATENT DOCUMENTS 4-293332  10/1992  Japan .

*Primary Examiner*—Thomas M. Heckler
*Attorney, Agent, or Firm*—Antonelli, Terry, Stout & Kraus, LLP

[57] ABSTRACT

A first variable delay circuit delays the reception data from the transmitting unit which is outputted from an input buffer and generates the delayed data to a data unidentifying time detecting portion. First and second latches have latch timings at regular intervals before and after a latch timing of a third latch for receiving and outputting by second and third variable delay circuits, respectively. In an adjusting operation, delay amounts of the second and third variable delay circuits are fixed to a value which is sufficiently smaller than a transfer period, a delay amount of the variable delay circuit is increased, a judging circuit detects a preceding edge of the reception data, subsequently, the delay amounts of the second and third variable delay circuits are sequentially increased while maintaining to the same value, and a following edge of the reception data is detected. In this instance, the timing of the third latch is set to the optimum point of the maximum margin. In a normal operation, the judging circuit detects a deviation from the optimum point and the delay amount of the first variable delay circuit is finely adjusted in accordance with the detection, thereby maintaining the latch timing of the reception data at the optimum point.

23 Claims, 13 Drawing Sheets

FIG.4

| ITEM | | WAVEFORM | LATCH OUTPUT | 5 OUTPUT | 6 OUTPUT |
|---|---|---|---|---|---|
| CLOCK TO BE INPUTTED TO LATCH L1 | | (5ns) | — | — | — |
| WHEN PHASE OF RECEPTION DATA IS PROPER | INPUT OF LATCH L0 | | H | L | L |
| | INPUT OF LATCH L1 | | H | | |
| | INPUT OF LATCH L2 | | H | | |
| WHEN PHASE OF RECEPTION DATA IS DEVIATED TO REAR SIDE | INPUT OF LATCH L0 | | H | L | H |
| | INPUT OF LATCH L1 | | H | | |
| | INPUT OF LATCH L2 | | L | | |
| WHEN PHASE OF RECEPTION DATA IS DEVIATED TO FRONT SIDE | INPUT OF LATCH L0 | t_SETUP  t_HOLD | L | H | L |
| | INPUT OF LATCH L1 | | H | | |
| | INPUT OF LATCH L2 | | H | | |

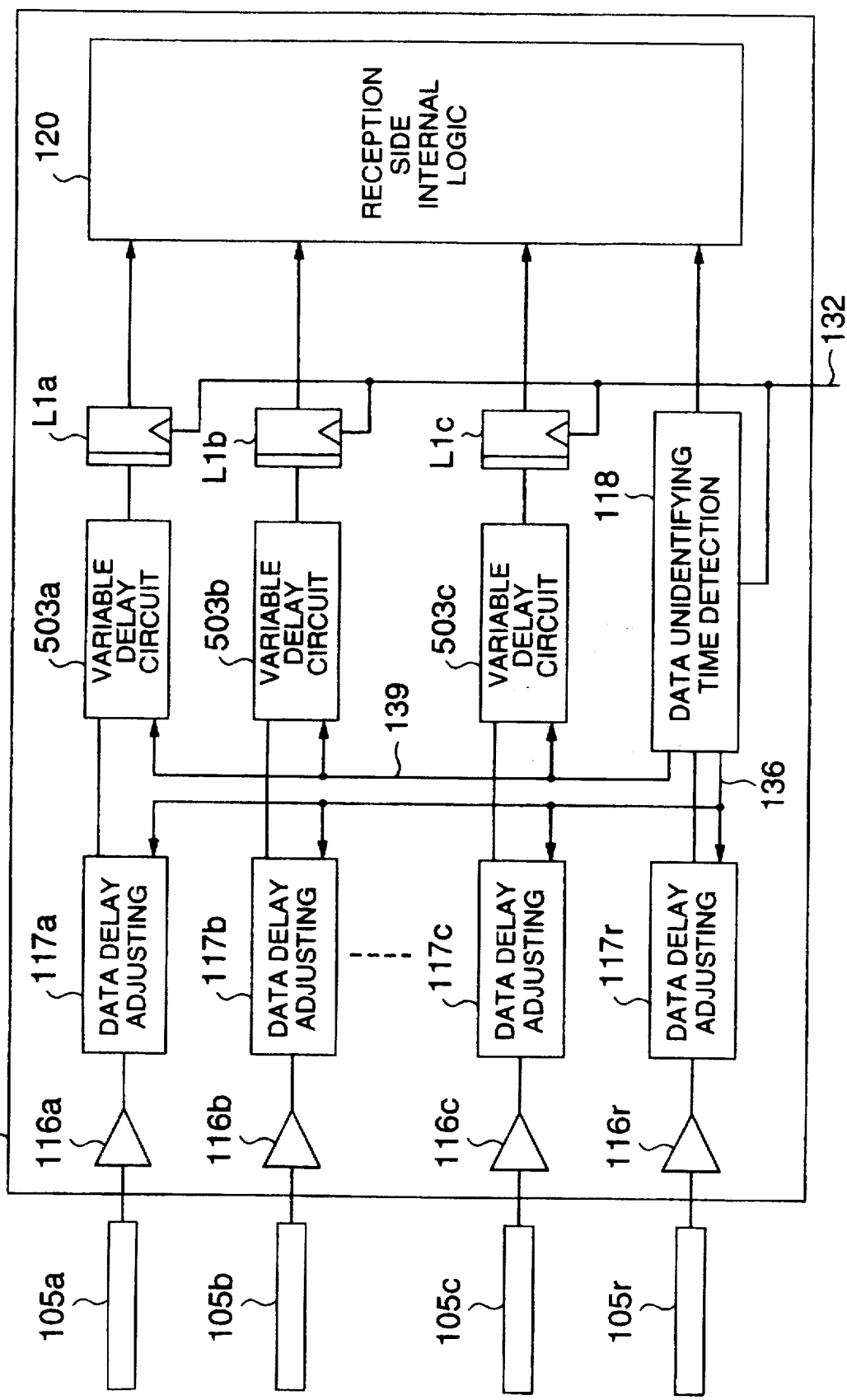

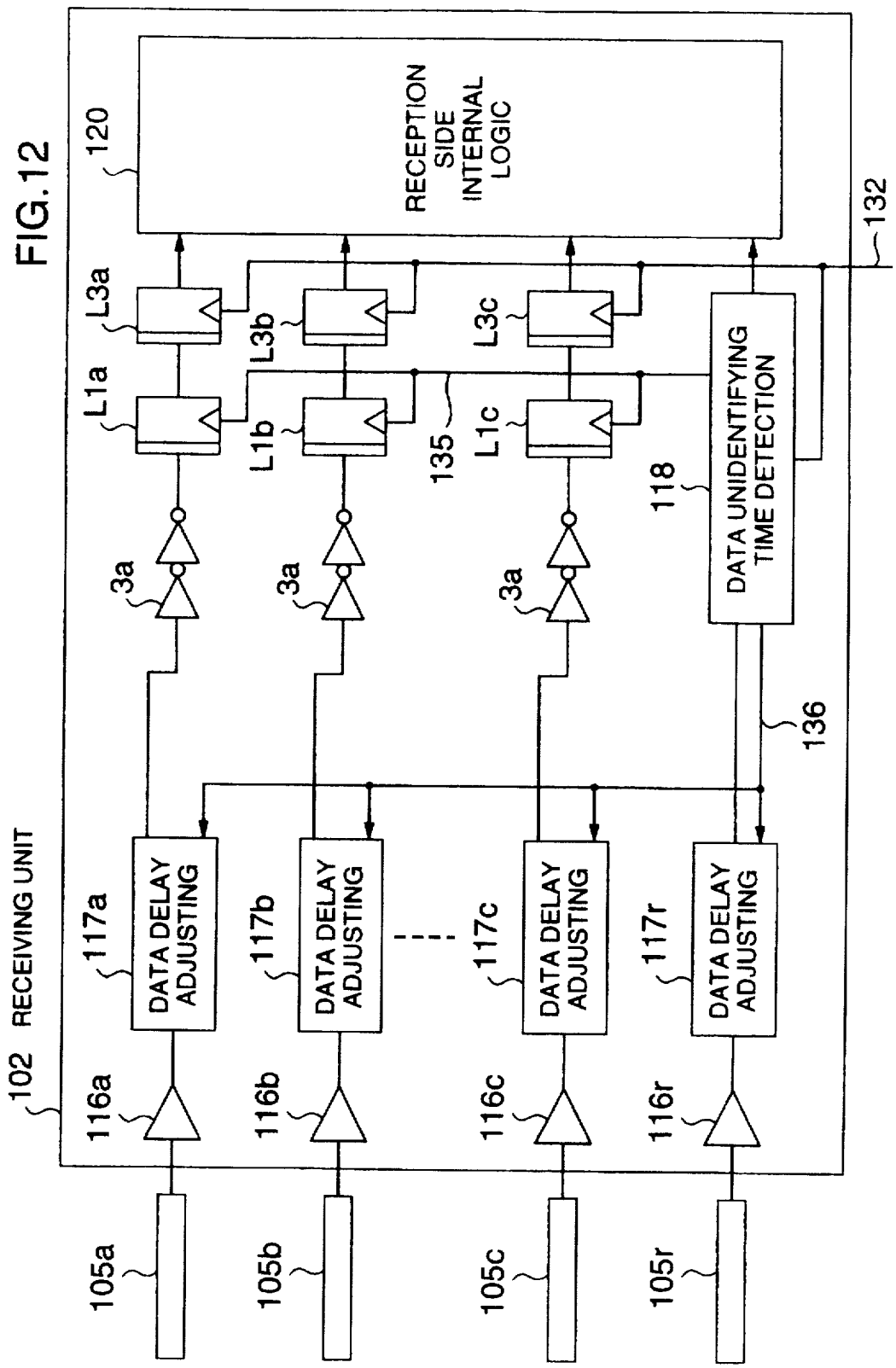

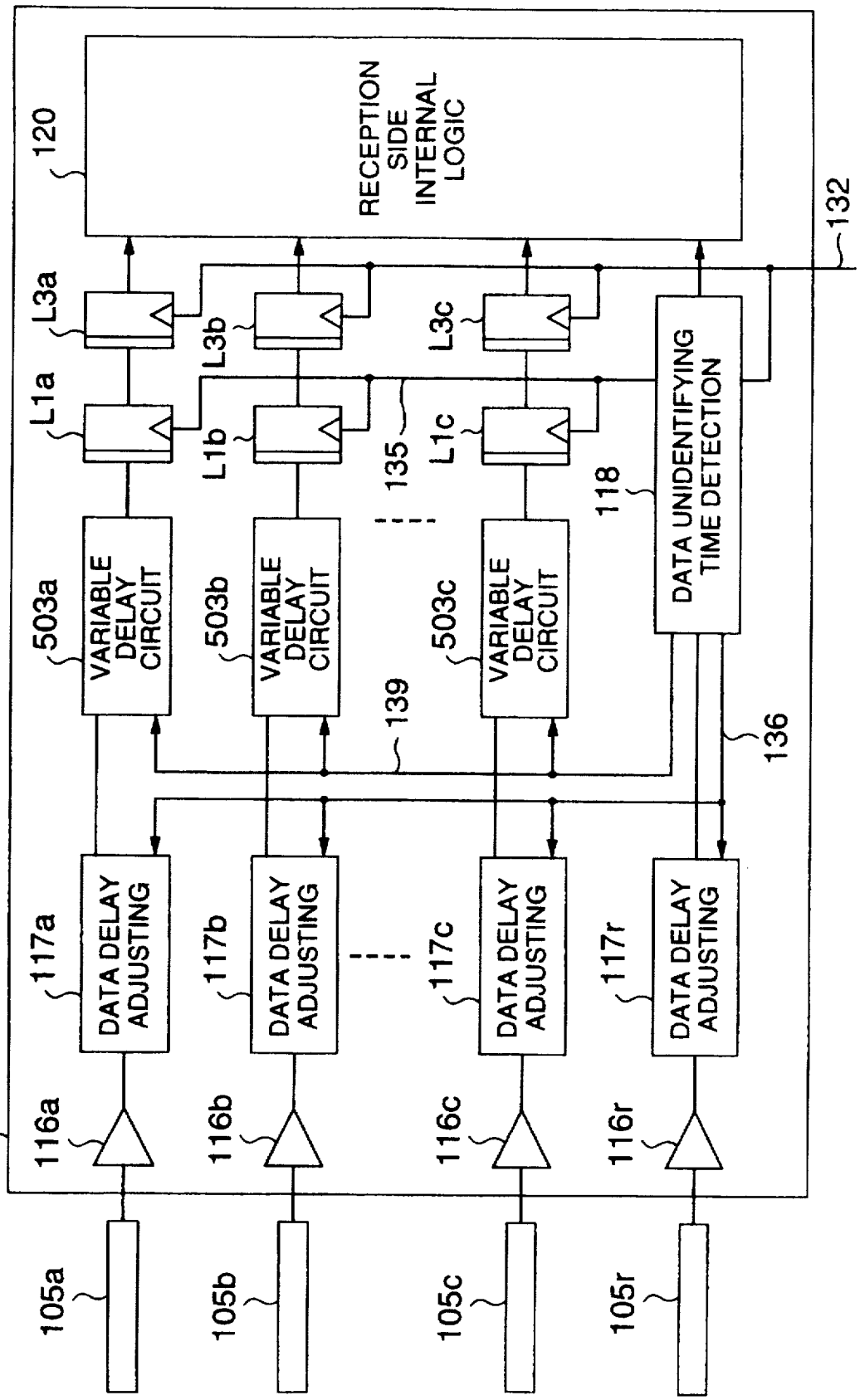

DATA TRANSFER APPARATUS FETCHING RECEPTION DATA AT MAXIMUM MARGIN OF TIMING

BACKGROUND OF THE INVENTION

The present invention relates to a synchronous data transfer apparatus which is used in a computer, a communication equipment or the like and, more particularly, to a data transfer apparatus which operates at a higher transfer frequency and enables data transfer of high throughput and low latency.

In the field of data transfer between LSIs constructing a computer, a data transfer between computers or the like, a synchronous data transfer in which input/output apparatuses on the transmission side and reception side operate by clocks having the same frequency is widely used. This is because in the synchronous data transfer, since the input/output apparatus on the reception side (hereinafter, referred to as a receiving unit) fetches data at a rate equal to a rate at which the input/output apparatus on the transmission side (hereinafter, referred to as a transmitting unit) transmits the data, namely, without causing a waistful waiting time, a transfer efficiency is higher than that of the asynchronous data transfer and the synchronous data transfer is advantageous for the high-speed data transfer. To improve the performance of such a computer system or the like, the improvement of the transfer frequency and the reduction of the latency in the synchronous data transfer are the important subjects.

In the synchronous data transfer, the reception data is fetched by latching the reception data synchronously with an internal clock of the receiving unit. In order to accurately fetch the reception data, it is necessary that the reception data has been identified to a potential level corresponding to a logic value of either one of the high level and the low level at a timing when a set-up time and a hold time are guaranteed before and after a latch timing of the reception latch. However, since the timing at which the reception data reaches the latch depends on a variation of a propagation delay time due to various factors such as length of a transmission line, operation temperature, and the like, there has conventionally been a problem such that it is remarkably difficult to raise a transfer frequency.

As one of the methods of solving the above problem, there is a source synchronous transfer method. The source synchronous transfer method features that the transmitting unit transmits a clock in parallel with data and the receiving unit latches reception data by the clock. For example, a DLL (Delay Lock Loop) method published in the International Solid-State Circuit Conference 94 FA 18.4, "A Phase-Tolerant 3.8 GB/s Data-Communication Router for a Multiprocessor Supercomputer Backplane" has an object to realize a high-speed data transfer by using the source synchronous transfer method. According to the DLL method, however, a reception data latched synchronously with the clock which had once been transferred in parallel needs to be allowed to pass through latches of multi-stages in order to newly synchronize the reception data with a clock in the receiving unit, so that there is a problem such that a whole time, namely, latency that is required for the data transfer is increased by only a time which is required for the multi-stage latches. It is considered that in the data transfer between a processor and a main storage or the like, since an increase in latency remarkably deteriorates the performance of a system, in the DLL method which needs the multi-stage latches, the improvement of the performance of the system cannot be sufficiently accomplished.

On the other hand, the "bit phase synchronizing circuit" disclosed in JP-A-4-293332 features that in order to guarantee the set-up time and hold time of the latch, a timing at which the reception data reaches the latch is adjusted by variable delay means and the multi-stage latches are unnecessary, so that it is excellent than the DLL method in that the latency is small.

The data transfer apparatus according to the bit phase synchronizing circuit has the following two problems.

First, since only whether the reception data simply guarantees the set-up time and hold time for the reception latch or not is detected, the latch timing of the reception data cannot be matched with the timing at which the maximum margin is obtained. A possibility such that the latch timing of the reception data is deviated to either one of a position near the preceding edge of the period of the reception data and a position near the following edge thereof is high. In the data transfer apparatus, generally, since a propagation delay time of data fluctuates due to various factors such as temperature change, fluctuation of a power source voltage, and the like with the elapse of time, the timing for receiving the data continuously changes little by little during the operation. Consequently, in a bit phase synchronizing circuit, readjustment of the latch timing is frequently executed and the operation is likely to be unstable and it is difficult to raise the transfer frequency to, for example, 100 MHz or higher.

Second, since it is necessary to provide variable delay means and phase detecting means of the reception data for each bit, a circuit scale increases in a parallel data transfer apparatus of a large bit width as in case of a construction between a processor of a computer and a main storage or the like.

For the bit phase synchronizing circuit, the foregoing DLL method mainly pays attention to an enlargement of a margin of the timing to latch the reception data. In the DLL method, the data and clock are transmitted in parallel from the transmitting unit, and in the receiving unit, the received clock is delayed by the variable delay means so that the data can be latched at an almost intermediate timing between the preceding and following edges of the period of the reception data, and the delay amount is feedback controlled. It is, therefore, considered that the above first problem can be slightly solved in the case where at least the transfer frequency is not so high in the order of tens of MHz. When the transfer frequency is raised, however, various noises including reflection noises due to connectors between the transmitting unit and the receiving unit or the like are multiplexed into the transfer data signal and the waveform is distorted. Thus, the timing to receive the pulse data largely fluctuates and a case where the data cannot be fetched at the intermediate timing of the period of the reception data occurs. Thus, there is a limitation in the realization of a high transfer speed by the DLL method.

SUMMARY OF THE INVENTION

It is an object of the invention to solve the above subjects and to provide a data transfer apparatus of high throughput and low latency in which even at a high transfer frequency, reception data can be certainly fetched at a timing of the maximum margin and which can be realized by a small circuit scale.

Another object of the invention is to provide a data receiving circuit which can receive data with high reliability in a data transfer between LSIs even when the transfer frequency is high.

According to one feature of the invention, there is provided a data transfer apparatus comprising: a transmitting unit; a receiving unit; means for connecting the transmitting unit and the receiving unit; operating state control means for outputting a signal for selecting either one of an adjusting operation and a normal operation to each of the transmitting unit and the receiving unit; and clock generating means for supplying a clock to the transmitting unit and the receiving unit, wherein the transmitting unit includes sync transmitting means for transmitting data synchronously with the clock supplied, the receiving unit includes first variable delay means for receiving the data and delaying and data unidentifying time detecting means for inputting an output of the first variable delay means, adjusting a delay amount of the first variable delay means, and outputting the reception data synchronizing with the clock, and the data unidentifying time detecting means includes second variable delay means for delaying the output of the first variable delay means, third variable delay means for delaying an output of the second variable delay means, reception data fetching means for fetching an output of the second variable delay means synchronously with the clock and outputting as the reception data, and timing judging means for judging whether a time at which a logic value of the data to be fetched is unidentified or undeterminable exists or not in a time period that is set by delay amounts of the second and third variable delay means before and after the timing when the reception data fetching means fetches the data and for adjusting the delay amounts of the first to third variable delay means in accordance with the result of the judgment.

According to another feature of the invention, in the data transfer apparatus with the above construction, further, when a skew between bits of the transfer data in the parallel data transfer is sufficiently smaller than a data period, in order to reduce a circuit scale, the data unidentifying time detecting means is provided only at a specific bit position of the transfer data.

In the operation of the data transfer apparatus according to the above construction, it has two operating states of the adjusting operation and the normal operation and in any one of the operating states, the transfer data is transmitted and received synchronously with the clock which is supplied from the clock generating means. At the time of the adjusting operation which is executed at least when the transfer apparatus is activated, the transmitting unit transmits data for adjustment synchronously with the clock and the receiving unit receives the data for adjustment and sets the delay amounts of the first to third variable delay means. At the time of the normal operation, the transmitting unit transmits arbitrary transfer data and the receiving unit receives the arbitrary transfer data.

The timing judging means mainly adjusts the delay amount of the first variable delay means so that the reception data can be fetched at the optimum timing and adjusts the delay amounts of the second and third variable delay means so that an (preceding) edge and a following edge of the reception data for the optimum timing can be monitored, respectively. For example, when the optimum timing at which the timing margin for fetching is maximum exists at the center between the preceding edge and the following edge of the reception data, at the time of the adjusting operation, the delay amount of the first variable delay means is first set, the delay amounts of the second and third variable delay means are subsequently set to an equal value, and the preceding edge and the following edge of the reception data are monitored in this state. At the time of the normal operation, the delay amount of the first variable delay means is finely adjusted so as to trace the data receiving timing which fluctuates little by little by a change in operating temperature or the like. As reception data fetching means, in case of using a latch such that the set-up time and the hold time are remarkably different is used or the like, the delay amounts of the second and third variable delay means are set to optimum values which are different from the equal value and the optimum timing can be obtained. The delay amounts of the second and third variable delay means can be also finely adjusted during the normal operation in correspondence to a waveform distortion or the like of the reception data.

In the parallel data transfer, in case of providing the data unidentifying time detecting means for only the specific bit of the transfer data, the data unidentifying time detecting means regarding the specific bit executes the above-mentioned setting and fine adjustment regarding the other bits which are not provided with the data unidentifying time detecting means.

BRIEF DESCRIPTION OF THE DRAWINGS

FIG. 4 is a timing chart showing a principle in which a data unidentifying time detecting portion 118 in FIG. 1 detects an unidentifying time of reception data;

FIG. 11 is a block diagram showing a construction of an embodiment 4 of the invention;

FIG. 12 is a block diagram showing a modification of the embodiment 4; and

FIG. 13 is a block diagram showing another modification of the embodiment 4.

DESCRIPTION OF THE PREFERRED EMBODIMENTS

Embodiments of the invention will now be described hereinbelow with reference to the drawings.

Embodiment 1

Figure 1:
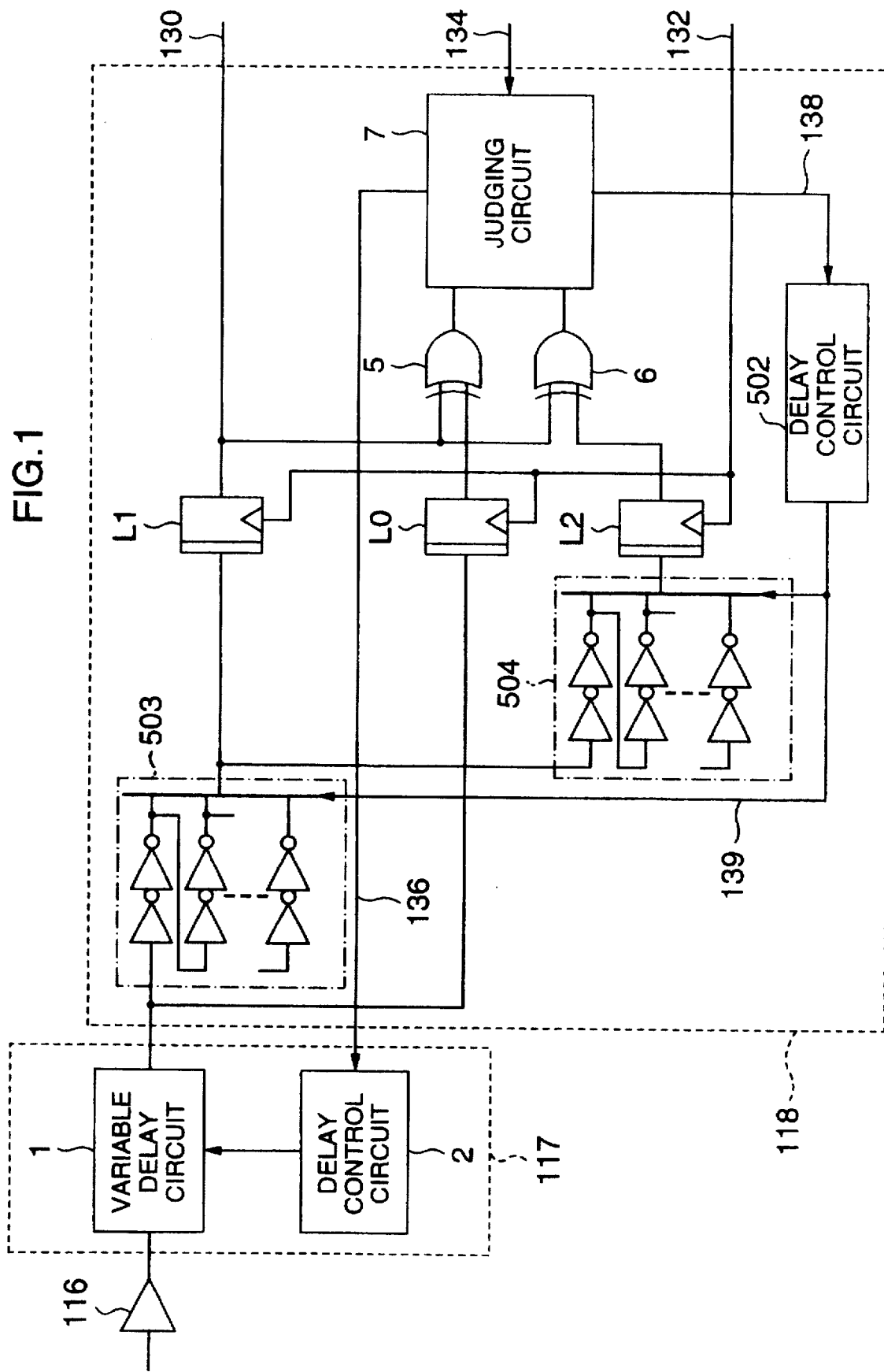
FIG. 1 is a block diagram showing an embodiment 1 of the invention.
Figure 5:
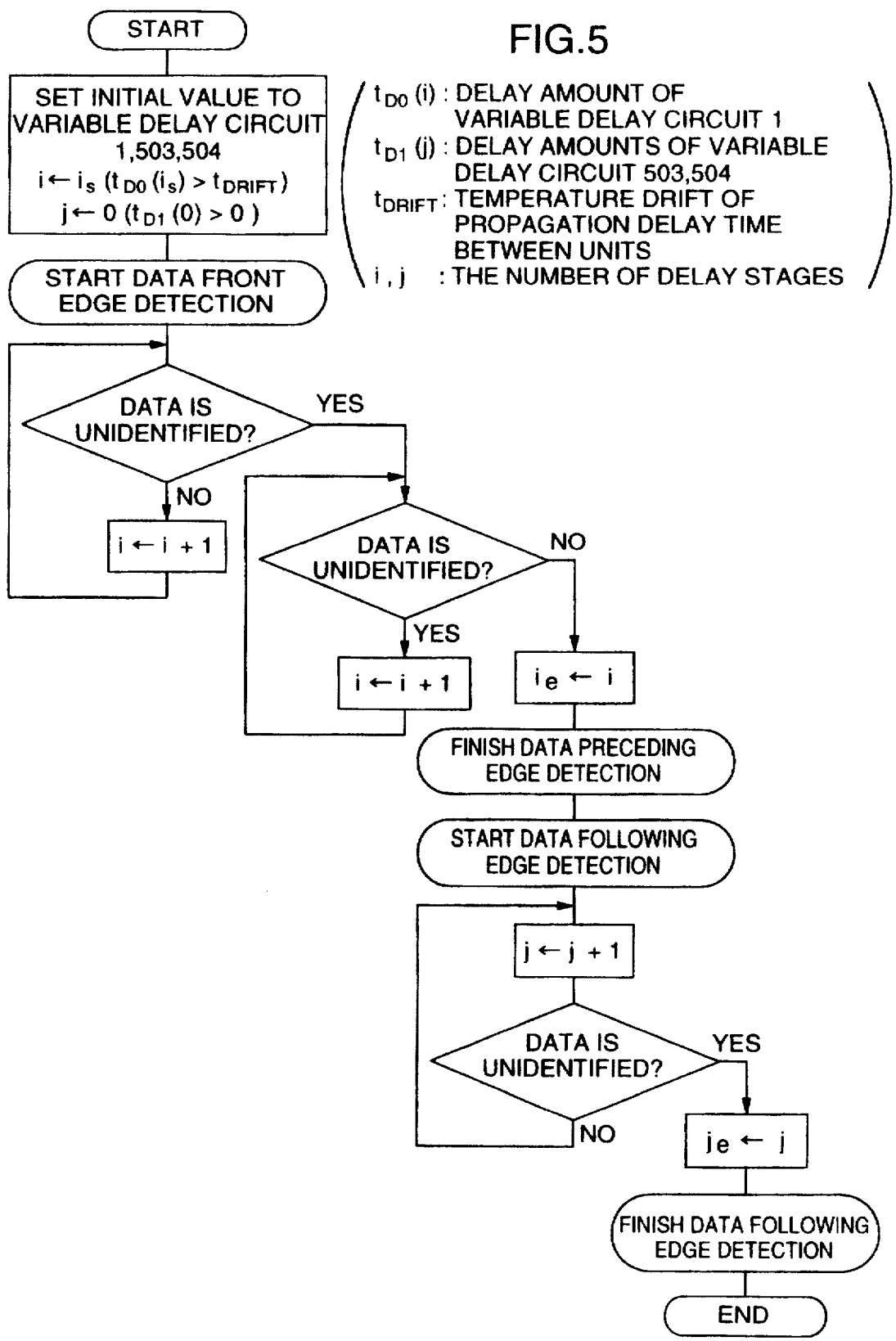
FIG. 5 is a flowchart showing an example of an adjusting procedure of the adjusting operation in the embodiment 1.

FIG. 1 shows in block diagram a main section of a receiving unit of a data transfer apparatus according to an embodiment of the invention. In FIG. 1, a reference numeral 1 denotes a variable delay circuit; 2 a delay control circuit;

5 and 6 exclusive-OR circuits; 7 a judging circuit which includes a logic circuit for executing a judging procedure shown in FIG. 5 and judges an (preceding) edge and a following edge of fetching data (pulse); 116 an input buffer circuit; 117 a data delay adjusting portion; 118 a data unidentifying time detecting portion; 130 a sync reception data output line for transferring sync reception data to an internal logic on the reception side; 132 a receiving unit internal clock supplying line; 134 a receiving unit control signal transmission line for supplying a control signal from a control portion of the data transfer apparatus; 136 a data delay adjustment control signal line; 138 a line for supplying, from the judging circuit 7, a control signal such as an increase/decrease pulse on the basis of a detection time of a data unidentifying time; 139 a transmission line of a control signal to set a delay amount by selecting the number of delays of each delay circuit; 502 a circuit which includes, for example, a counter and generates a delay control signal; 503 and 504 variable delay circuits such as serial inverters; and L0, L1, and L2 latches.

Figure 2:
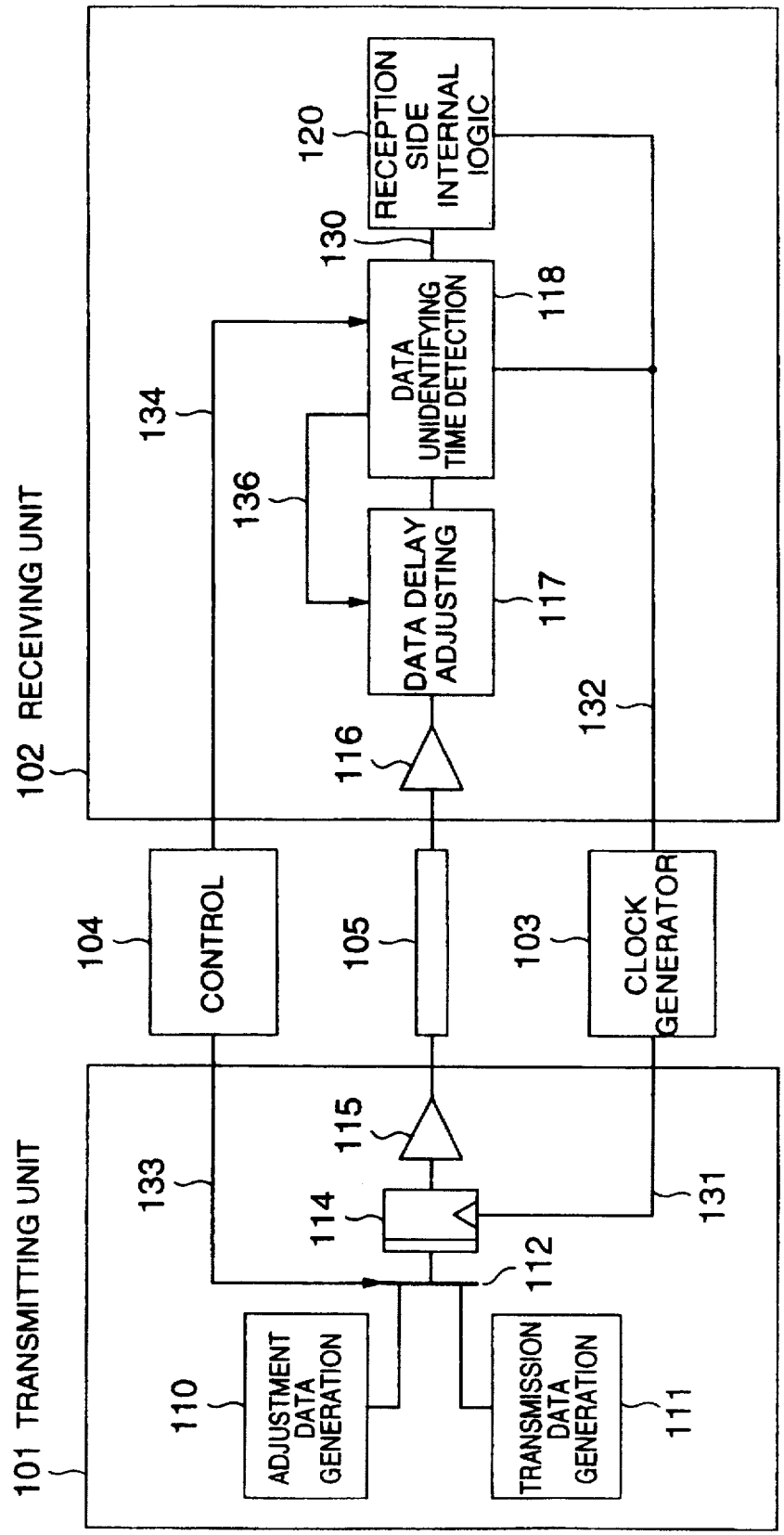
FIG. 2 is a block diagram showing a whole construction of a data transfer apparatus according to the embodiment 1 of the invention.

FIG. 2 shows a whole construction of the data transfer apparatus according to the embodiment 1. In FIG. 2, reference numeral 101 denotes a transmitting unit; 102 a receiving unit (FIG. 1); 103 a clock generator; 104 a control portion; 105 a data transfer line; 110 an adjustment data generating portion; 111 a transmission data generating portion; 112 a transmission data selector for selecting either one of adjustment data of an adjusting operation and transmission data of a normal operation by a selection instructing signal (133) from the control portion 104; 114 a latch; 115 an output buffer circuit; 120 a reception side internal logic; 131 a transmitting unit internal clock supplying line; and 133 the transmitting unit control signal line.

In FIG. 2, the data transfer apparatus according to the invention operates synchronously with a clock of, for example, 100 MHz or higher which is supplied from the clock generator 103. However, in general, since propagation delay times of the transmitting unit internal clock line 131 and receiving unit internal clock line 132 are not equal, phases of internal clocks of the transmitting unit 101 and receiving unit 102 are different. The data transfer apparatus has two operating states of the adjusting operation and the normal operation and switches the operating state by the operating state control signal (133) which is supplied from the control portion 104. At the time of the adjusting operation, the transmitting unit 101 transmits predetermined adjustment data synchronized with the transmitting unit internal clock by the latch 114. At the time of the normal operation, the transmitting unit 101 similarly executes an arbitrary data transmission to the receiving unit 102, specifically to the reception side internal logic 120. The transmitted data is transferred to the receiving unit 102 through the data transfer line 105 of a rate of, for example, above 100 MHz.

Figure 3:
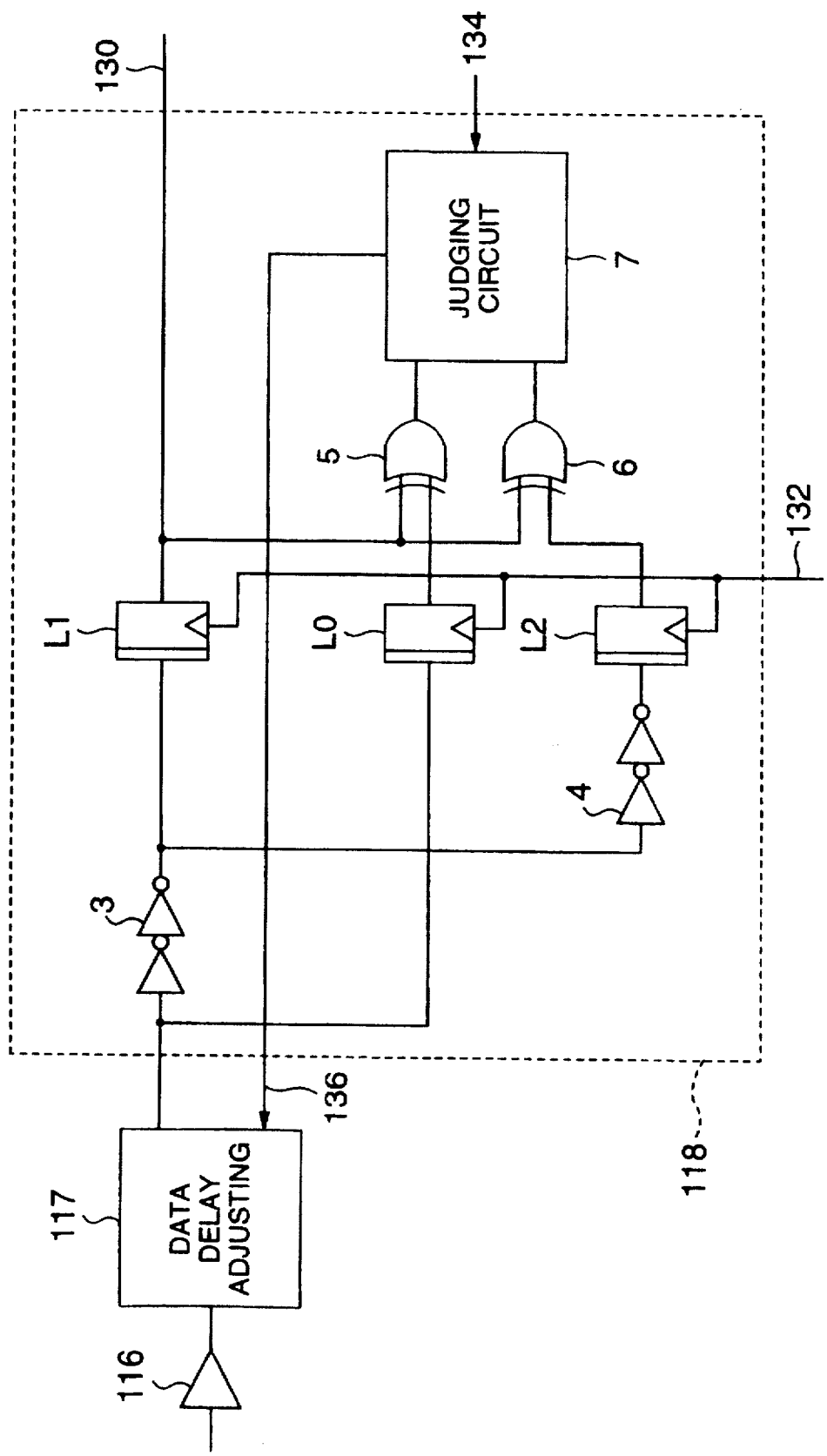
FIG. 3 is a block diagram showing a main section of a receiving unit of a data transfer apparatus according to a prior art.

FIG. 3 shows a construction of a main section of the receiving unit by the bit phase synchronizing circuit disclosed in JP-A-4-293332 as a prior art. In FIG. 3, reference numerals 3 and 4 denote fixed delay circuits.

In a receiving unit according to the prior art of FIG. 3, data is received by the input buffer circuit 116, the reception data is delayed by the data delay adjusting portion 117 so that the timing at which the reception data is unidentified does not overlap a set-up time or a hold time of the latch L1 by the clock, and the reception data is synchronized with an internal clock which is supplied from the receiving unit internal clock line 132 by the latch L1. The latches L0 and L2 latch the reception data at timings just before and after the latch timing of the latch L1, respectively. By comparing those three latch outputs by the exclusive-OR circuits 5 and 6, a fact that the timing at which the reception data is unidentified overlaps the set-up time or hold time of the latch L1 is detected, thereby controlling a delay amount of the data delay adjusting portion 117 on the basis of a detection result.

According to the prior art, there are problems such that since only a fact that the latch timing is located at either one of the preceding edge and the following edge of the reception data can be detected, the latch timing cannot be adjusted to the optimum point of the reception data, and since an operation margin of the latch L1 is small, the operation is likely to be unstable. In case of using the prior art for the parallel data transfer, since it is necessary to provide the data delay adjusting portion 117, latches L0 and L2, judging circuit 7, and the like for all bits, there is also a problem such that a circuit scale is extremely large.

In FIGS. 1 to 2, the receiving unit 102 synchronizes the reception data to the receiving unit internal clock which is supplied from the clock generator 103. At the time of the adjusting operation, the data unidentifying time detecting portion 118 sets a delay amount of the data delay adjusting portion 117 and delay amounts of the delay circuits 503 and 504 so that the latch L1 can latch the reception data at the optimum point. At the time of the normal operation, even when the receiving timing of the reception data changes due to a temperature change or the like, by always finely adjusting the delay amount of the data delay adjusting portion 117, the latch timing of the latch L1 is maintained to the optimum point. An unidentifying time detecting method of the reception data and the adjusting operations at the times of the adjusting operation and the normal operation will now be sequentially explained.

FIG. 4 shows a principle in which the data unidentifying time detecting portion 118 detects an unidentifying time of the reception data. In FIG. 4, $t_{SETUP}$ and $t_{HOLD}$ denote a set-up time and a hold time of the latches L0, L1, and L2, respectively. When the logic value of the reception data is unidentified in a time of the hold time from the set-up time, the latch cannot fetch the correct value. Therefore, it has to be constructed so that the latch L1 does not enter such a situation.

In FIG. 1, the latch L1 fetches and synchronizes the value of the reception data. On the other hand, the latch L0 latches the reception data at a timing that is preceding to the latch L1 by a time of only the delay amount of the delay circuit 503. The latch L2 latches the reception data at a timing which is subsequent to the latch L1 by a time of only the delay amount of the delay circuit 504. As shown in FIG. 4, when the reception data has a proper phase, all of the latches L0, L1, and L2 generate signals at the same level, so that both of outputs of the exclusive-OR circuits 5 and 6 are set to the "L" level. When the phase of the reception data is deviated to the rear side for the internal clock, the output levels of the latches L1 and L2 are different, so that the output of the exclusive-OR circuit 6 is set to the "H" level. On the contrary, when the phase of the reception data is shifted to the front side for the internal clock, the output levels of the latches L0 and L1 are different, the output of the exclusive-OR circuit 5 is set to the "H" level. Therefore, for example, when the delay amounts of the delay circuits 503 and 504 are enough smaller than the period of the reception data, the judging circuit 7 can detect that the latch timing of the latch L1 is located near the preceding edge or the following edge of the reception data from the outputs of the exclusive-OR circuits 5 and 6.

FIG. 5 is a diagram showing an example of an adjusting procedure of the adjusting operation in the embodiment 1.

Figure 6:
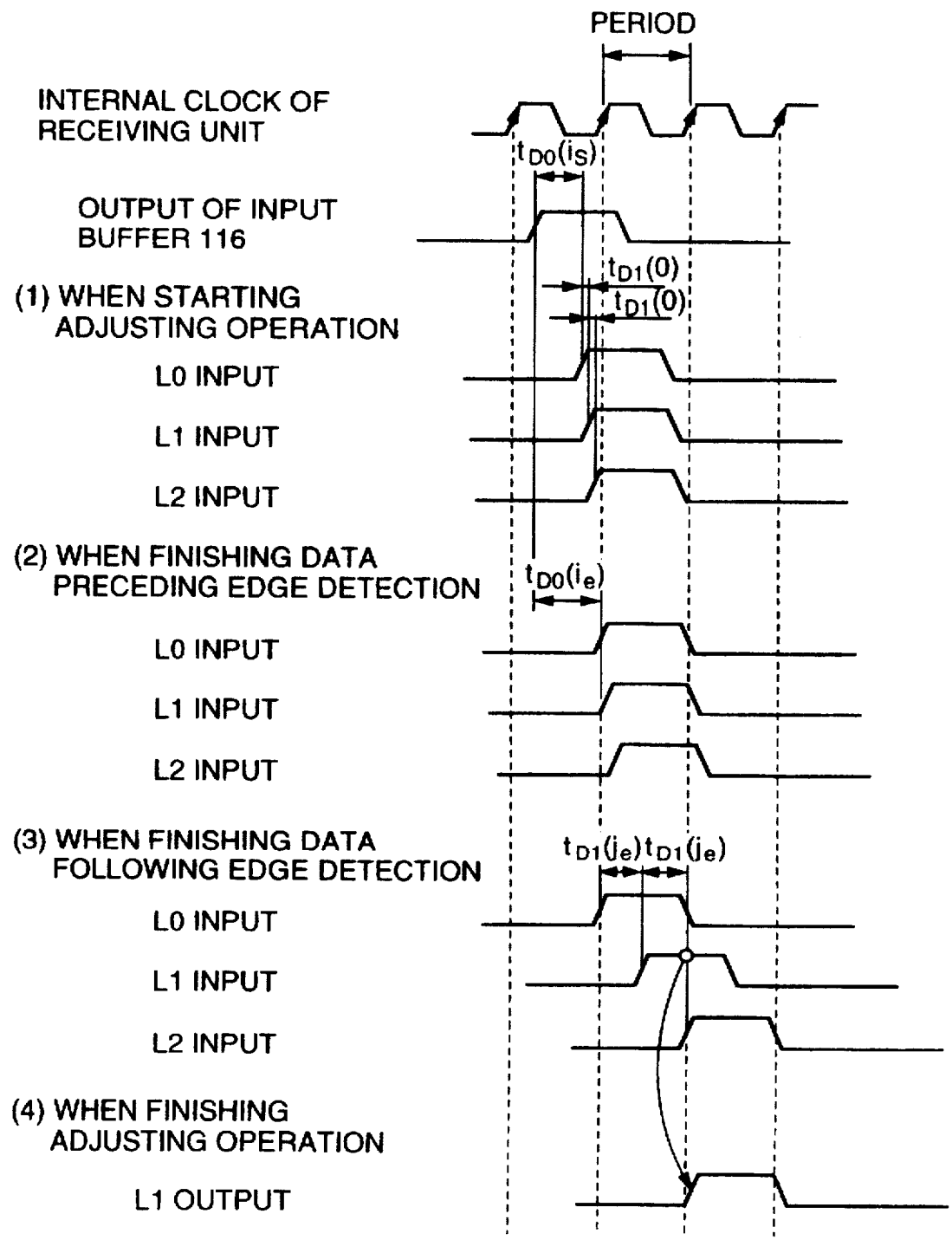
FIG. 6 is a timing chart showing an example of operation waveforms by the adjusting procedure of FIG. 5.

FIG. 6 shows an example of operation waveforms according to the adjusting procedure of FIG. 5. In FIG. 5, "i" denotes the number of delay stages of the variable delay circuit 1; "j" the number of delay stages of each of the variable delay circuits 503 and 504; $t_{DO(i)}$ a delay amount of the variable delay circuit 1 when the number of delay stages is equal to (i); $t_{D1(j)}$ a delay amount of each of the variable delay circuits 503 and 504 when the number of delay stages is equal to (j); and $d_{DRIFT}$ a maximum value of a phase change of the reception data due to a temperature change or the like during the operation.

As shown in FIG. 5, at the start of the adjusting operation, the maximum value $t_{DRIFT}$ of a phase change that will be predicted is set into an initial value $t_{DO(is)}$ of the delay amount of the variable delay circuit 1 in a manner such that even if the adjusting operation is finished at i=$i_s$, the apparatus can cope with a phase change in reception data due to a temperature change or the like. The delay amounts of the variable delay circuits 503 and 504 are set to the same value $t_{D1(j)}$. In order to detect that the latch timing of the latch L1 is located at a position near the preceding or following edge of the reception data as mentioned above, a value which is sufficiently smaller than the period of the reception data of a single pulse as shown in FIG. 4 is set as an initial value $t_{D1(0)}$. When the adjusting operation is started, for example, predetermined adjustment data which is set so as to become a different value for only one period of time after it was previously set to a constant value for a long period of time or the like is transmitted from the transmitting unit 101. The receiving unit 102 receives the adjustment data and sequentially increases $t_{DO(i)}$ until the data unidentifying time is detected. When the data unidentifying time is detected, the latch timing of the latch L1 is located at the following edge of the reception data. By further increasing $t_{DO(i)}$ from this point, the latch timing of the latch L1 is again deviated from the data unidentifying time. At this time, the latch timing of the latch L0 is located at the preceding edge of the reception data. $t_{DO(i)}$ is fixed to a value $t_{DO(ie)}$ (delay amount) at this time. Subsequently, $t_{D1(j)}$ is sequentially increased until the data unidentifying time is detected. When the data unidentifying time is detected, the latch timing of the latch L2 is located at the following edge of the reception data. $t_{D1(j)}$ is fixed to a value $t_{D1(je)}$ (delay amount) at this time. In this state, the latch timing of the latch L0 is located at the preceding edge of the reception data, the latch timing of the latch L2 is located at the following edge of the reception data, and the delay circuits 503 and 504 are set to the same delay amount. Therefore, the latch timing of the latch L1 is located at the intermediate timing between the latch timings of the latches L0 and L2, namely, at the center (optimum point) in a time (window) during which the reception data can be latched. The margin is maximum. In this way, the adjusting operation is finished and the transmitting and receiving unites start the normal operations by the control of the transfer data on the transmission side by the selection signal of the control portion 104.

FIG. 6 shows operation waveforms at the time of the above adjusting operation. As shown in FIG. 6, when the adjusting operation is finished, the latch L1 latches the reception data at the center of the window and synchronizes it with the internal clock of the receiving unit.

In the normal operation, since the delay amount $t_{D1(je)}$ of the variable delay circuits 503 and 504 is initially held to the value set at the time of the adjusting operation, when the phase of the reception data is deviated due to a temperature change or the like, an output of either one of the exclusive-OR circuits 5 and 6 is set to the "H" level. The judging circuit 7 adjusts the delay amount $t_{DO(i)}$ of the variable delay circuit 1 on the basis of this output. The latch timing of the latch L1 is again matched with the optimum point of the reception data.

By the construction and operation as mentioned above, there are the following effects in the embodiment 1 according to the invention.

(1) By simultaneously detecting both of the preceding and following edges of the reception data during the adjusting operation and by setting the center timing between them to the latch timing, the latch timing can be set to the timing (optimum point) at which the operation margin is maximum.

(2) Since the deviation from the optimum point is detected and the delay amount of the variable delay circuit 1 is finely adjusted during the normal operation, even in the case where the propagation delay time of the reception data fluctuates due to a temperature change or the like, the latch timing is always maintained to the optical point and the stable operation can be performed.

(3) Since the reception data is synchronized with the internal clock without using the latches of multi-stages, the latency does not increase in association with the synchronization.

The embodiment has been described with respect to the example in the case where the optimum point of the fetching timing is located at the center between the preceding and following edges of the reception data. However, it will be obviously understood that, for example, in the case where the optimum point is deviated from the center or the like, the delay amounts of the variable delay circuits 503 and 504 are set to different optimum values, or in the case where the waveform is deformed due to noises or the like during the normal operation, by finely adjusting those delay amounts or the like, effects similar to those mentioned above can be obtained.

Embodiment 2

Figure 7:
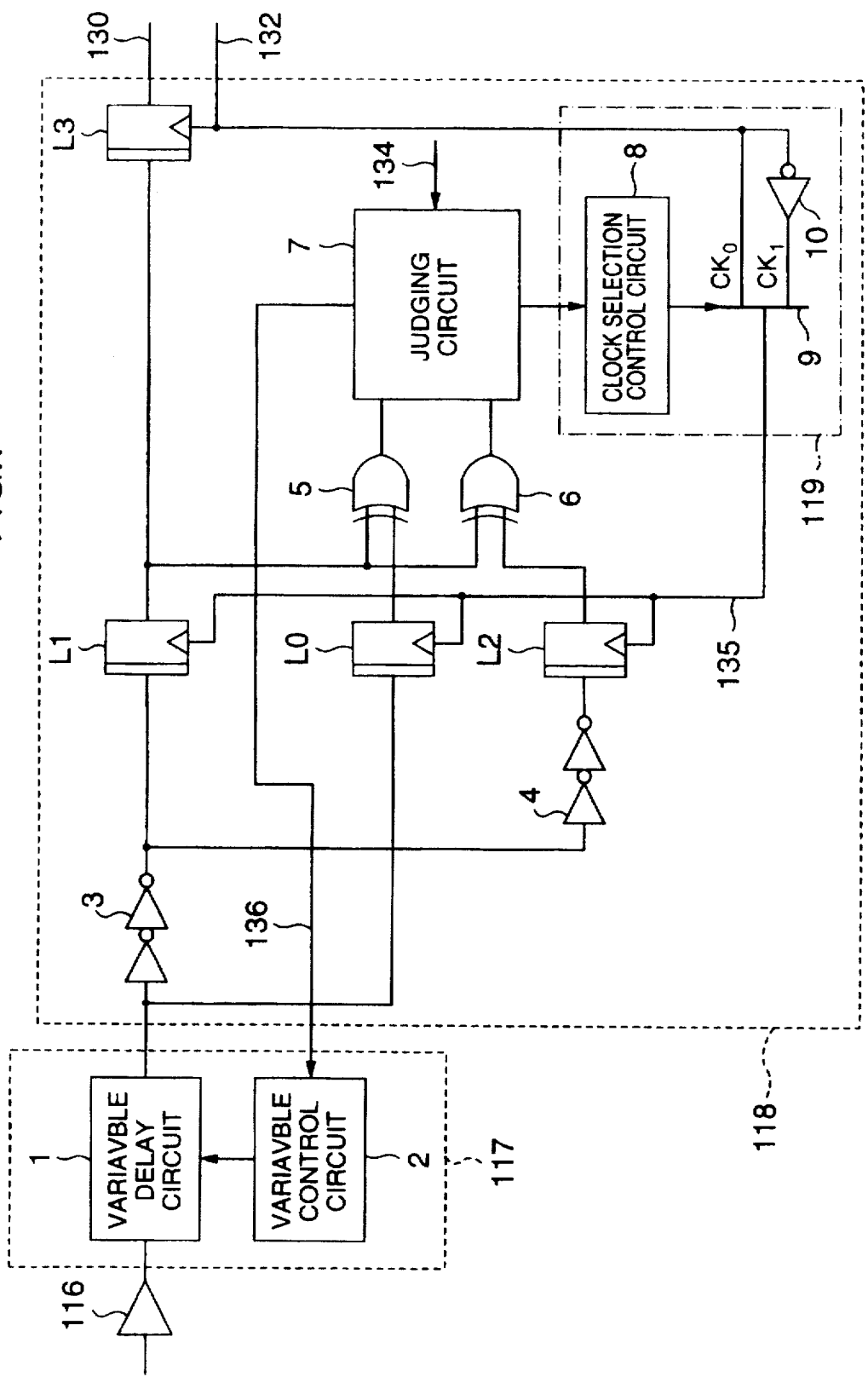
FIG. 7 is a block diagram showing an embodiment 2 of the invention.

FIG. 7 diagrammatically shows a data transfer apparatus according to an embodiment 2 of the invention. In FIG. 7, reference numeral 8 denotes a clock selection control circuit; 9 a clock selector; 10 a clock inverting circuit; 119 a latch clock generator; 135 a latch clock line; L3 a latch; CK0 a receiving unit internal clock; and CK1 a half period delay clock of CK0.

The latch clock generator 119 generates a latch clock (second clock) having a predetermined phase relation with an internal clock (first clock) which is supplied from the receiving unit internal clock line 132 to the latch clock line 135. The receiving unit 102 first synchronizes the reception data with the latch clock by the latch L1 and subsequently synchronizes the reception data with the receiving unit internal clock by the latch L3. The data unidentifying time detecting portion 118 sets the delay amount of the data delay adjusting portion 117 and the phase of the latch clock so that the reception data can be latched at the optimum point at which the margin becomes maximum. At the time of the adjusting operation, the receiving unit 102 sets information regarding those controls. At the time of the normal operation, the delay amount of the data delay adjusting portion 117 is always finely adjusted. By this method, the latch timing is maintained so that the reception data is not unidentified in the set-up time and hold time of the latch due to the temperature change or the like.

In FIG. 7, the latch clock generator 119 receives the internal clock 132, selects either one of the internal clock CK0 and the half period delay clock CK1 by the clock selector 9, and generates the latch clock 135. The clock selection control circuit 8 controls the clock which is selected by the clock selector 9 and the switching timing on the basis of the detection result of the data unidentifying time of the judging circuit 7. To accurately detect the time at which the reception data is unidentified, the delay amounts of the fixed delay circuits 3 and 4 are set to values which are sufficiently smaller than the transfer period. The adjusting operation and the normal operation will now be sequentially explained hereinbelow.

Figure 8:
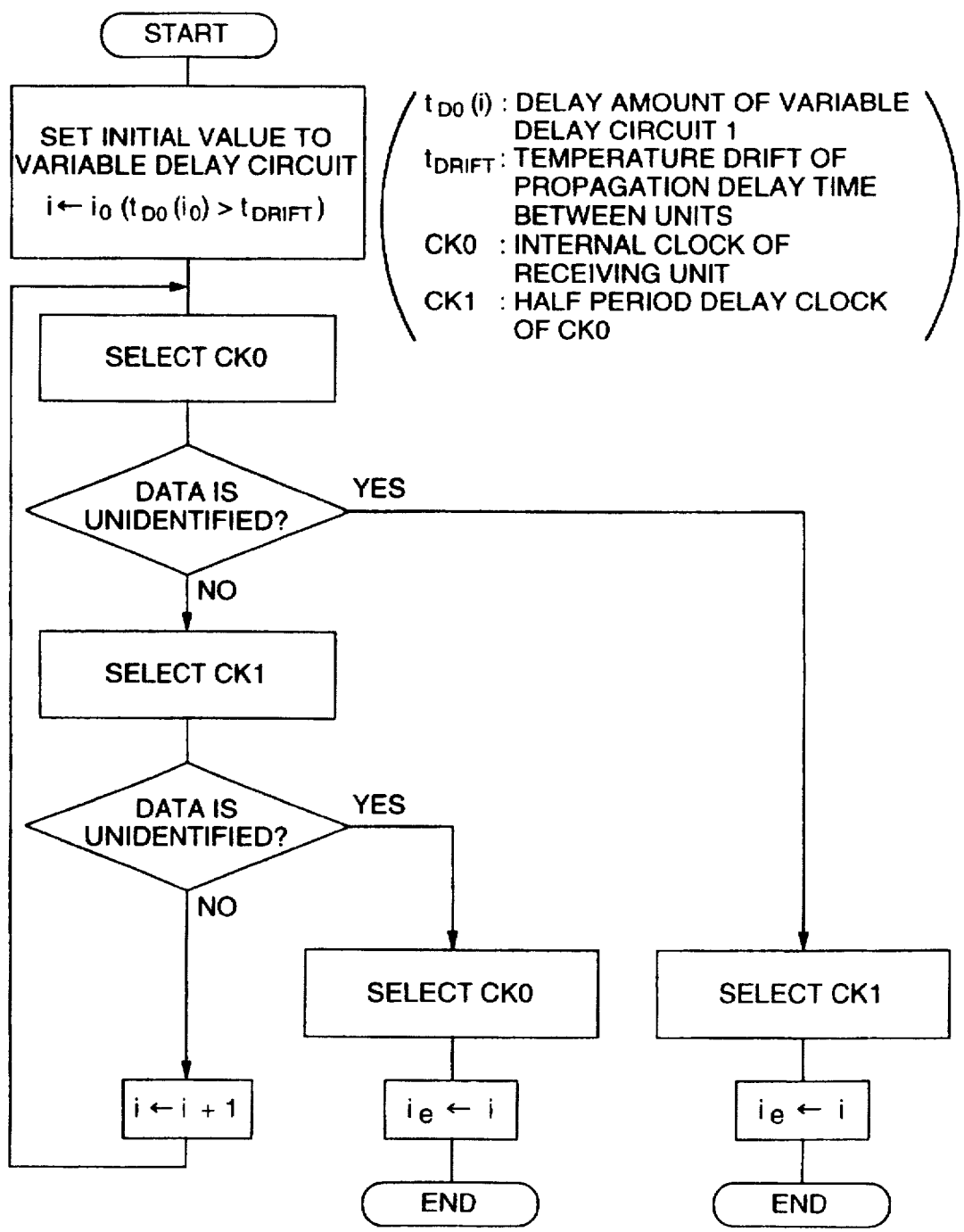
FIG. 8 is a flowchart showing an example of an adjusting procedure of the adjusting operation in the embodiment 2 of the invention.
Figure 9:
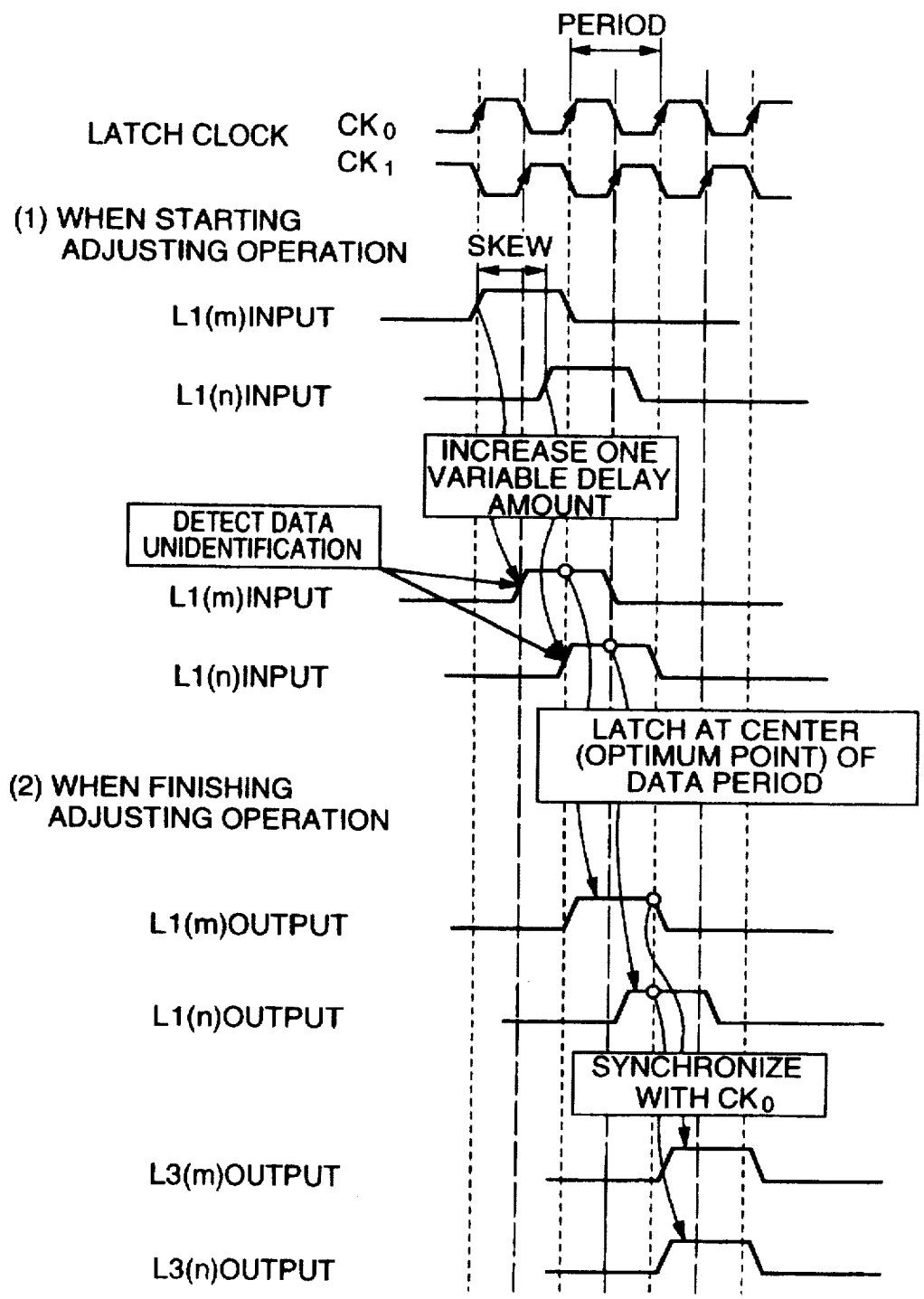
FIG. 9 is a waveform diagram showing an example of operation waveforms according to the adjusting procedure of FIG. 8.

FIG. 8 shows an example of an adjusting procedure of the adjusting operation in the embodiment 2. FIG. 9 shows an example of operation waveforms when the adjusting procedure of FIG. 8 is executed. In FIG. 9 m and n denote suffixes indicative of the bits in which the propagation delay times from the latch 114 of the transmitting unit to the latch L1 of the receiving unit is minimum and maximum, respectively.

As shown in FIG. 8, at the time of the adjusting operation, in the receiving unit 102, until the transmitting unit 101 receives the transmitted data for adjustment and the latch timing of the latch L1 synchronized with either CK0 or CK1 becomes the unidentifying time of the reception data, the delay amount of the variable delay circuit 1 is increased by the delay control circuit 2 in response to an output of the judging circuit 7. At this time, for example, in the case where the latch timing becomes the unidentifying time of the reception data when the reception data is latched synchronously with CK0, the latch timing synchronized with CK1 having a phase of a half period delay is located at an almost center position. Therefore, by selecting CK1 as a latch clock, the timing near the optimum point can be latched.

The adjusting procedure will now be described with reference to the operation waveforms of FIG. 9. For example, there is considered a case where the bits m and n indicative of the maximum and minimum bits of the propagation delay time have phases as shown in FIG. 9(1) at the start of the adjustment, respectively. In FIG. 9, in the case where it is intended to latch the reception data by the latch L1 at the timing of CK0 as it is without using the receiving unit 102 according to the embodiment, since the bit m cannot guarantee the set-up time and hold time of L1, there is a possibility such that the correct value cannot be outputted. There is also a possibility such that the bit n is delayed than the bit m by one period. According to the embodiment, as mentioned in FIG. 8, as mentioned in FIG. 8, when the unidentifying time of the reception data is detected by increasing the delay amount of the variable delay circuit 1, the clock of the phase different from that upon detection is set into the latch clock line 135 and the reception data is latched at the center of the data. Subsequently, as shown in FIG. 9(2), the reception data is synchronized with the internal clock (CK0) by the latch L3.

On the other hand, at the time of the normal operation, by always finely adjusting the delay amount of the variable delay circuit 1 on the basis of the detection result of the unidentifying time of the judging circuit 7, the phase drift in association with the change in operation temperature or the like is absorbed.

By the construction and operation as mentioned above, according to the embodiment 2 of the invention, since one of the clocks of two phases which are deviated by the half period from each other can be selected as a latch clock, it is sufficient that the variable delay circuit 1 can delay within a range of the half period. Therefore, the delay range of the variable delay circuit 1 which occupies a relatively large circuit scale can be set to an almost half range as compared with that in the prior art. There is an effect such that the circuit scale can be reduced. Further, by providing two or more phases of the latch clock and by constructing so as to select the clock which is deviated from the latch clock by the half period when the latch timing of the latch L1 overlaps with the unidentifying time of the reception data, the variable range of the variable delay circuit 1 can be also further reduced.

Embodiment 3

Figure 10:
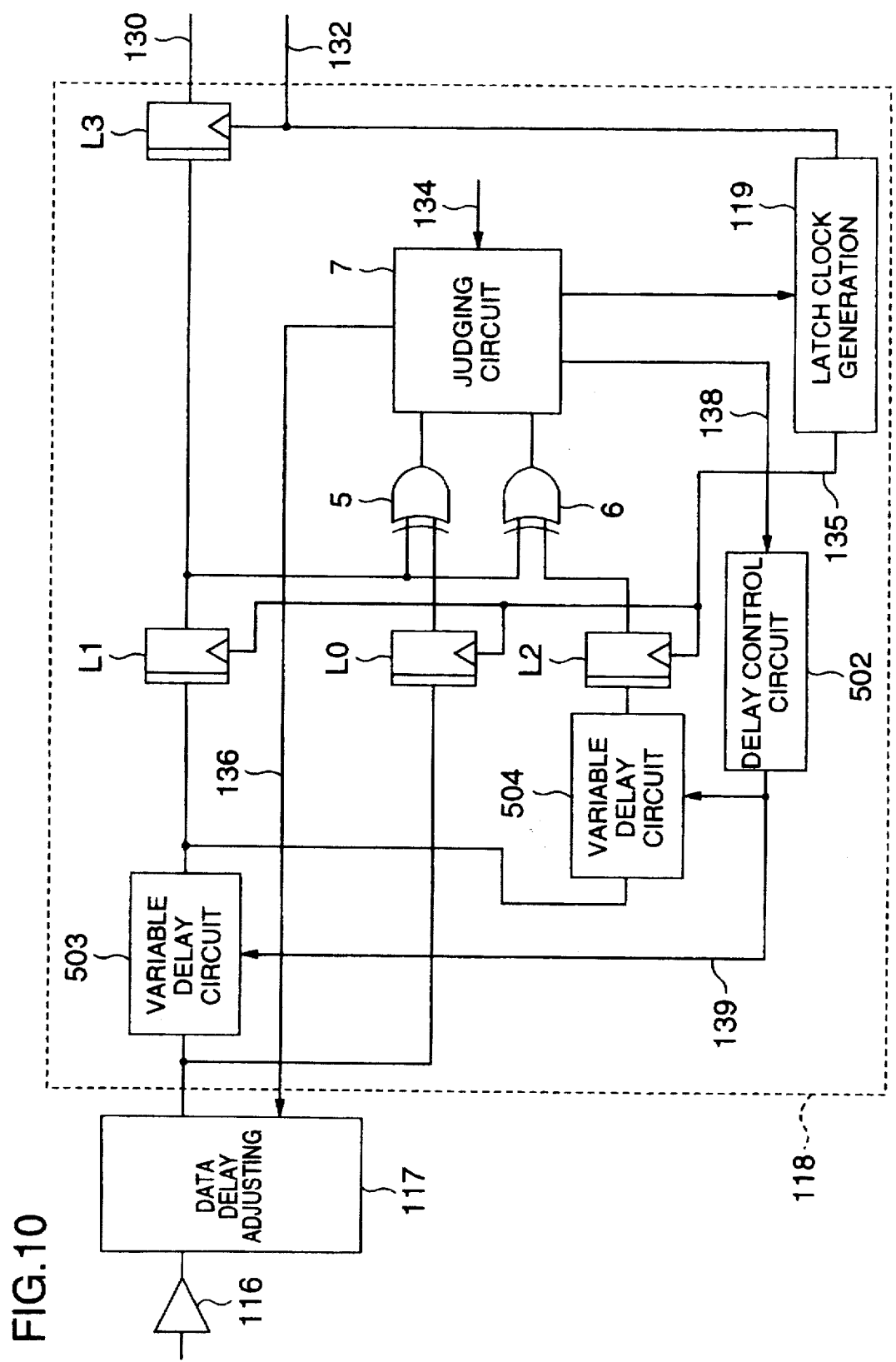
FIG. 10 is a block diagram showing an embodiment 3 of the invention.

FIG. 10 shows a block diagram of an embodiment 3 constructed so as to have both of the effects of the embodiments 1 and 2 of the data transfer apparatus according to the invention.

In the adjusting operation, in a manner similar to the cases of the embodiments 1 and 2, as for the initialization at the start of the adjusting operation, a value corresponding to the phase change amount of the reception data due to the temperature change or the like that is presumed is selected as a delay amount $t_{D0}$ of the variable delay circuit 1, a value which is sufficiently smaller than the transfer period is selected as a delay amount $t_{D1}$ of the variable delay circuits 503 and 504, and CK0 is selected as a clock of the latch L1. Each time $t_{D0}$ is sequentially increased, CK0 and CK1 are switched. When either CK0 or CK1 sets the latch timing of the latch L0 so as to reach the preceding edge of the reception data earlier, the latch clock in this instance and the delay amount $t_{D0}$ of the variable delay circuit 1 are held. Subsequently, in a manner similar to the embodiment 1, $t_{D1}$ is sequentially increased and held until the latch timing of the latch L2 reaches the following edge of the reception data. The adjusting operation is finished in this manner and the normal operation is started.

By the construction and operation as mentioned above, the effects of both of the embodiments 1 and 2 can be provided. There are also advantages such that the latch timing of the reception data can be always maintained at the optimum point during the operation, the delay range of the variable delay circuit 1 which occupies a relatively large circuit scale can be set to an almost half as compared with that of the embodiment 1 or the prior art, and the circuit scale can be reduced. By constructing so as to select the clock to latch the reception data from the clocks CKn (n=0, 1, . . . ) having a predetermined phase relation with the clock which is supplied from the clock generator 103, the delay range of the variable delay circuit 1 which is required for adjustment of the latch timing can be suppressed to a smaller range and the circuit scale can be reduced.

Embodiment 4

FIG. 11 is a diagram showing a construction of an embodiment 4 of a data transfer apparatus according to the invention and relates to the parallel data receiving unit 102 constructed on the basis of the embodiment 1. In FIG. 11, although the number of bits of the parallel transfer data is equal to, for example, 64, such a bit number is not limited to 64. Reference characters a, b, and c denote suffixes showing bits and r indicates a suffix showing a reference bit.

In the parallel data transfer, in the data, among the bits installed on the same LSI, same connector, or same package board, a skew between bits of the propagation delay time in a range from the transmission latch 114 to the reception latch L1 is sufficiently smaller than the transfer period of the data. Therefore, there is no need to detect the unidentifying time of the reception data with respect to all of the bits. Therefore, it is sufficient that by a construction as shown in FIG. 11, the unidentifying time of the data is detected with respect to one bit among them and the other bits are uniformly controlled.

In FIG. 11, bit r denotes the reference bit which is referred to detect the unidentifying time of the reception data from transfer lines; 105a to 105r. On the basis of the detection result, not only a delay amount from a data delay adjusting portion 117r of the bit r but also delay amounts of data delay adjusting portions 117a to 117c of the other bits a to c and delay amounts of variable delay circuits 503a to 503c are controlled in a manner similar to the embodiment 1. Therefore, with respect to the bits a to c, the exclusive-OR circuits 5 and 6, judging circuit 7, variable delay circuit 504, latches L0 and L2, and the like are unnecessary, so that the circuit scale of the receiving unit 102 can be reduced by an amount corresponding to such an unnecessary component elements.

FIG. 12 shows a modification of the embodiment 4 of FIG. 11 constructed on the basis of the embodiment 2. In FIG. 12, on the basis of the detection result of the bit r, the delay amounts of the data delay adjusting portions 117a to 117c and the phase of the latch clock are controlled in a manner similar to the embodiment 2. FIG. 13 shows another modification of the embodiment 4 of FIG. 11 constructed on the basis of the embodiment 3. In FIG. 13, on the basis of the detection result of the bit r, the delay amounts of the data delay adjusting portions 117a to 117c and the phase of the latch clock are controlled in a manner similar to the embodiment 3. In the constructions 2 and 3, since the number of data unidentifying time detecting portion 118 and the like can be reduced in a manner similar to the construction 1, the circuit scale of the receiving unit 102 can be reduced by an amount of such a small number of component elements.

By the construction and operation as mentioned above, in the embodiment 4 and its modifications according to the invention, a plurality of bits such that the skew between the bits is sufficiently smaller than the transfer period are set to a group in the parallel data transfer, the data unidentifying time detecting portion 118 is provided for only a specific data every such a group, and the setting and control of the latch timings regarding all of the bits in the group including the other bits for which the data unidentifying time detecting portion 118 is not provided are executed on the basis of the detection result. There are, consequently, advantages such that the number of data unidentifying time detecting portions 118 which are required for detection of the optimum point can be remarkably reduced and the circuit scale of the whole unit can be reduced.

According to the data transfer apparatus of the invention, in the synchronous data transfer apparatus for performing the data transfer between the transmitting unit 101 and receiving unit 102 synchronously with the clock which is supplied from the clock generator 103, there are advantageous effects such that by the improvement of the transfer frequency, the data transfer of high throughput and low latency can be realized by a circuit of a small scale. Although the data transfer apparatus of a binary logic has been described above as an example in the invention, it will be obviously understood that there are also similar effects even in case of applying the invention to a data transfer apparatus of multi-value logic.

What is claimed is:

1. A data transfer apparatus comprising:
   a transmitting unit;
   a receiving unit;
   means for connecting said transmitting unit and said receiving unit;
   operating state control means for generating a signal to select an adjusting operation or a normal operation to each of said transmitting unit and said receiving unit;
   clock generating means for supplying a clock to each of said transmitting unit and said receiving unit; and
   synchronization (sync) transmitting means, in said transmitting unit, for transmitting data to said receiving unit synchronously with the clock supplied to said transmitting unit,
   wherein said receiving unit includes first variable delay means for receiving and delaying said data from said sync transmitting means and data unidentifying time detecting means for receiving an output of said first variable delay means, adjusting a delay amount of said first variable delay means, and generating reception data synchronized with said clock, and
   said data unidentifying time detecting means includes second variable delay means for delaying the output of said first variable delay means, third variable delay means for delaying an output of said second variable delay means, reception data fetching means for fetching the output of said second variable delay means synchronously with the clock and generating as said reception data, and timing determining means for fetching output data of said first variable delay means and said third variable delay means synchronously with said clock, determining whether said fetched output data coincides with said reception data and adjusting the delay amounts of said first to third variable delay means in accordance with the determining result.

2. An apparatus according to claim 1, wherein said transmitting unit includes adjustment data generating means for transmitting specific data to said receiving unit in the adjusting operation, and said receiving unit includes means for setting and holding control information to adjust the delay amounts of the first, second, and third variable delay means in response to an input of said specific data from said transmitting unit.

3. An apparatus according to claim 1, wherein while said timing determining means transfers arbitrary data in the normal operation, said receiving unit adjusts the delay amount of said first, second, or third variable delay means.

4. An apparatus according to claim 1, wherein the delay amounts of said second and third variable delay means are equal.

5. A data transfer apparatus comprising:
   a transmitting unit;
   a receiving unit;
   means for connecting said transmitting unit and said receiving unit;
   operating state control means for generating a signal to select an adjusting operation or a normal operation to each of said transmitting unit and said receiving unit;
   clock generating means for supplying a clock to each of said transmitting unit and said receiving unit; and
   sync transmitting means, in said transmitting unit, for transmitting data to said receiving unit synchronously with the clock supplied to said transmitting unit,
   wherein said receiving unit includes first variable delay means for receiving and delaying said data from said sync transmitting means and data unidentifying time detecting means for receiving an output of said first variable delay means, adjusting a delay amount of said first variable delay means, and generating reception data synchronized with said clock, and said data unidentifying time detecting means includes second variable delay means for delaying the output of said first variable delay means, third variable delay means for delaying an output of said second variable delay means, local clock generating means for generating a local clock of a different phase synchronously with the clock which is inputted from said clock generating means, first reception data fetching means for fetching the output of said second variable delay means synchronously with said local clock, second reception data fetching means for fetching an output of said first reception data fetching means synchronously with the clock which is inputted from said clock generating means and generating as said reception data, and timing determining means for determining whether said fetched output data conincides with said reception data and adjusting the delay amounts of said first to third variable delay means and the phase of said local clock in accordance with the determining amount.

6. An apparatus according to claim 5, wherein in the adjusting operation, said transmitting unit transmits specific data to said receiving unit and said receiving unit sets and holds control information to adjust the delay amounts of said first to third variable delay means and the phase of said local clock.

7. An apparatus according to claim 5, wherein while transferring arbitrary data in the normal operation, said receiving unit adjusts the delay amount of said first, second, or third variable delay means.

8. A data transfer apparatus comprising:

a transmitting unit;

a receiving unit;

means for connecting said transmitting unit and said receiving unit;

operating state control means for generating a signal to select an adjusting operation or a normal operation to each of said transmitting unit and said receiving unit;

clock generating means for supplying a clock to each of said transmitting unit and said receiving unit; and sync transmitting means, in said transmitting unit, for transmitting data to said receiving unit synchronously with the clock supplied to said transmitting unit, wherein said receiving unit includes variable delay means for receiving and delaying said data from said sync transmitting means and data unidentifying time detecting means for receiving an output of said variable delay means, adjusting a delay amount of said variable delay means, and generating reception data synchronized with said clock, and said data unidentifying time detecting means includes first fixed delay means for delaying the output of said variable delay means, second fixed delay means for delaying an output of said first fixed delay means, local clock forming means for generating a local clock of a different phase synchronously with the clock which is inputted from said clock generating means, first reception data fetching means for fetching the output of said first fixed delay means synchronously with said local clock, second reception data fetching means for fetching an output of said first reception data fetching means synchronously with the clock which is inputted from said clock generating means and generating as said reception data, and timing determining means for determining whether said fetched output data coincides with said reception data and adjusting the delay amount of said variable delay means and the phase of said local clock in accordance with the determining result.

9. An apparatus according to claim 8, wherein in the adjusting operation, said transmitting unit transmits specific data to said receiving unit and said receiving unit sets and holds control information to adjust the delay amount of said variable delay means and the phase of said local clock.

10. An apparatus according to claim 8, wherein while transferring arbitrary data in the normal operation, said receiving unit adjusts the delay amount of said variable delay means.

11. A data receiving circuit comprising first variable delay means for receiving and delaying data and data unidentifying time detecting means for receiving an output of said first variable delay means, adjusting a delay amount of said first variable means, and generating reception data synchronized with a clock which is inputted externally, wherein said data unidentifying time detecting means includes: second variable delay means for delaying the output of said first variable delay means; third variable delay means for delaying an output of said second variable delay means; reception data fetching means for fetching the output of said second variable delay means synchronously with the clock and generating as said reception data; and timing determining means for determining whether said fetched output data coincides with said reception data, and for adjusting the delay amounts of said first to third variable delay means in accordance with the determining result.

12. A circuit according to claim 11, wherein the delay amounts of said second and third variable delay means are equal.

13. A data receiving circuit comprising first variable delay means for receiving and delaying data and data unidentifying time detecting means for receiving an output of said first variable delay means, adjusting a delay amount of said first variable delay means, and generating reception data synchronized with a clock which is inputted externally, wherein said data unidentifying time detecting means includes: second variable delay means for delaying the output of said first variable delay means; third variable delay means for delaying an output of said second variable delay means; local clock forming means for generating a local clock of a different phase synchronously with said externally inputted clock; first reception data fetching means for fetching the output of said second variable delay means synchronously with said local clock; second reception data fetching means for fetching an output of said first reception data fetching means synchronously with said clock and generating as said reception data; and timing determining means for determining whether said fetched output data coincides with said reception data, and adjusting the delay amounts of said first to third variable delay means and the phase of said local clock in accordance with the determining amount.

14. A data receiving circuit comprising variable delay means for receiving and delaying data and data unidentifying time detecting means for receiving an output of said variable delay means, adjusting a delay amount of said variable delay means, and generating reception data synchronized with a clock which is inputted externally, wherein said data unidentifying time detecting means includes: first fixed delay means for delaying the output of said variable delay means; second fixed delay means for delaying an output of said first fixed delay means; local clock forming means for generating a local clock of a different phase synchronously with said clock which is inputted externally; first reception data fetching means for fetching the output of said first fixed delay means synchronously with said local clock; second reception data fetching means for fetching an output of said first reception data fetching means synchronously with said clock and generating the fetched output as said reception data; and timing determining means for determining whether said fetched output data coincides with said reception data, and adjusting the delay amount of said variable delay means and the phase of said local clock in accordance with the determining result.

15. A data transfer apparatus comprising: a transmitting unit; a receiving unit; means for connecting said transmitting unit and said receiving unit; operating state control means for generating a signal to select an adjusting operation or a normal operation to each of said transmitting unit and said receiving unit; and clock generating means for supplying a clock to each of said transmitting unit and said receiving unit, wherein said transmitting unit includes (n) sync transmitting means for transmitting data to said receiving unit in (n-bit) parallel synchronously with the clock supplied from said clock generating means, said receiving unit includes first variable delay means for receiving and delaying the first bit position among said parallel data from said (n) sync transmitting means, data unidentifying time detecting means for receiving an output of said first variable delay means, adjusting a delay amount of said first variable delay means, and generating first-bit reception data synchronized with the clock, fourth variable delay means for receiving and delaying each of the second to n-th bits from said (n) sync transmitting means, and second reception data fetching means for fetching an output of said fourth variable delay means and generating second to n-th bit reception data synchronously with the clock, said data unidentifying time detecting means includes second variable delay means for delaying the output of said first variable delay means, third variable delay means for delaying an output of said second variable delay means, reception data fetching means for fetching the output of said second variable delay means synchronously with the clock and generating as said reception data, and timing determining means for fetching output data of said first variable delay means and said third variable delay means synchronously with said clock, determining whether said fetched output data coincides with said reception data and adjusting the delay amounts of said first to third variable delay means in accordance with the determining result, and said timing determining means processing the data of the first bit position adjusts a delay amount of said fourth variable delay means processing each of said second to n-th bit positions.

16. A data transfer apparatus comprising: a transmitting unit; a receiving unit; means for connecting said transmitting unit and said receiving unit; operating state control means for generating a signal to select an adjusting operation or a normal operation to each of said transmitting unit and said receiving unit; and clock generating means for supplying a clock to each of said transmitting unit and said receiving unit, wherein said transmitting unit includes (n) sync transmitting means for transmitting data to said receiving unit in (n-bit) parallel synchronously with the clock supplied from said clock generating means, said receiving unit includes first variable delay means for receiving and delaying the first bit position among said parallel data from said (n) sync transmitting means, data unidentifying time detecting means for receiving an output of said first variable delay means, adjusting a delay amount of said first variable delay means, and generating first-bit reception data synchronized with the clock.

said data unidentifying time detecting means includes second variable delay means for delaying an output of said first variable delay means, third variable delay means for delaying an output of said second variable delay means, local clock forming means for generating a local clock of a different phase synchronized with the clock which is inputted from said clock generating means, first reception data fetching means for fetching the output of said second variable delay means synchronously with said local clock, second reception data fetching means for fetching an output of said first reception data fetching means synchronously with the clock which is inputted from said clock generating means and generating as said reception data, and timing determining means for determining whether said fetched output data coincides with said reception data, and adjusting the delay amounts of said first to third variable delay means and the phase of said local clock in accordance with the determining result, said data unidentifying time detecting means includes fourth variable delay means for receiving and delaying each of said second to n-th bits from said (n) sync transmitting means, third reception data fetching means for fetching an output of said fourth variable delay means synchronously with said local clock, and fourth reception data fetching means for receiving an output of said third reception data fetching means and generating second to n-th bit reception data synchronized with the clock which is inputted from said clock generating means, and said timing determining means processing the first bit position adjusts a delay amount of said fourth variable delay means with respect to each of said second to n-th bit positions.

17. A data transfer apparatus comprising: a transmitting unit; a receiving unit; means for connecting said transmitting unit and said receiving unit; operating state control means for generating a signal to select an adjusting operation or a normal operation to each of said transmitting unit and said receiving unit; and clock generating means for supplying a clock to each of said transmitting unit and said receiving unit, wherein said transmitting unit includes (n) sync transmitting means for transmitting data to said receiving unit in (n-bit) parallel synchronously with the clock supplied, said receiving unit includes first variable delay means for receiving and delaying the first bit position among said parallel data from said (n) sync transmitting means, data unidentifying time detecting means for receiving an output of said first variable delay means, adjusting a delay amount of said first variable delay means, and generating reception data synchronized with the clock.

said data unidentifying time detecting means includes first fixed delay means for delaying an output of said first variable delay means, second fixed delay means for delaying an output of said first fixed delay means, local clock forming means for generating a local clock of a different phase synchronized with the clock which is inputted from said clock generating means, first reception data fetching means for fetching the output of said first fixed delay means synchronously with said local clock, second reception data fetching means for fetching an output of said first reception data fetching means synchronously with the clock which is inputted from said clock generating means and generating as said reception data, and timing determining means for determining whether said fetched output data coincides with said reception data, and adjusting the delay amounts of said first variable delay means and the phase of said local clock in accordance with the determining result, said data unidentifying time detecting means includes second variable delay means for receiving and delaying each of said second to n-th bits from said (n) sync transmitting means, third reception data fetching means for fetching an output of said second variable delay means synchronously with said local clock, and fourth reception data fetching means for receiving an output of said third reception data fetching means and generating second to n-th bit reception data synchronized with the clock which is inputted from said clock generating means, and said timing determining means processing the first bit position adjusts a delay amount of said second variable delay means with respect to each of said second to n-th bit positions.

18. A data receiving circuit comprising first variable delay means for receiving and delaying data and data unidentifying time detecting means for receiving an output of said first variable delay means, adjusting a delay amount of said first variable delay means, and generating reception data synchronized with a clock which is inputted externally, wherein said data unidentifying time detecting means includes: second variable delay means for delaying an output of said first variable delay means; third variable delay means for delaying an output of said second variable delay means; first reception data fetching means for fetching the output of said first variable delay means synchronously with the clock; second reception data fetching means for fetching an output of said second variable delay means synchronously with the clock and generating the fetched output as said reception data; third reception data fetching means for fetching an output of said third variable delay means synchronously with the clock; first comparing means for comparing logic values of outputs of said first and second reception data fetching means; second comparing means for comparing logic values of outputs of said second and third reception data fetching means; and delay amount adjusting means for receiving comparison results of said first and second comparing means and adjusting the delay amounts of said first to third variable delay means.

19. A data receiving circuit comprising first variable delay means for receiving and delaying data and data unidentifying time detecting means for receiving an output of said first variable delay means, adjusting a delay amount of said first variable delay means, and generating reception data synchronized with a clock which is inputted externally, wherein said data unidentifying time detecting means includes: second variable delay means for delaying an output of said first variable delay means; third variable delay means for delaying an output of said second variable delay means; local clock forming means for generating a local clock of a different phase synchronized with said clock; first reception data fetching means for fetching the output of said first variable delay means synchronously with said local clock; second reception data fetching means for fetching the output of said second variable delay means synchronously with said local clock; third reception data fetching means for fetching an output of said third variable delay means synchronously with the local clock; fourth reception data fetching means for fetching an output of said second reception data fetching means synchronously with said clock and generating the fetched output as said reception data; first comparing means for comparing logic values of outputs of said first and second reception data fetching means; second comparing means for comparing logic values of outputs of said second and third reception data fetching means; and delay amount adjusting means for receiving comparison results of said first and second comparing means and adjusting the delay amounts of said first to third variable delay means and the phase of said local clock.

20. A data receiving circuit comprising variable delay means for receiving and delaying data and data unidentifying time detecting means for receiving an output of said variable delay means, adjusting a delay amount of said variable delay means, and generating reception data synchronized with a clock which is inputted externally, wherein said data unidentifying time detecting means includes: first fixed delay means for delaying an output of said variable delay means; second fixed delay means for delaying an output of said first fixed delay means; local clock generating means for generating a local clock of a different phase synchronized with the clock which is inputted externally; first reception data fetching means for fetching the output of said variable delay means synchronously with said local clock; second reception data fetching means for fetching the output of said first fixed delay means synchronously with said local clock; third reception data fetching means for fetching an output of said second fixed delay means synchronously with said local clock; fourth reception data fetching means for fetching an output of said second reception data fetching means synchronously with said clock and generating as said reception data;

first comparing means for comparing logic values of outputs of said first and second reception data fetching means; second comparing means for comparing logic values of output of said second and third reception data fetching means; and delay amount adjusting means for receiving comparison results of said first and second comparing means and adjusting the delay amount of said variable delay means and the phase of said local clock.

21. A data transfer apparatus comprising:

a transmitting unit;

a receiving unit;

a data transfer line connecting said transmitting unit and said receiving unit;

an operating state control circuit configured to generate a signal to select an adjusting operation or a normal operation to each of said transmitting unit and said receiving unit;

a clock generating circuit configured to supply a clock to each of said transmitting unit and said receiving unit; and a synchronization (sync) transmitting circuit, in said transmitting unit, configured to transmit data to said receiving unit synchronously with the clock supplied to said transmitting unit, wherein said receiving unit includes a first variable delay circuit configured to receive and delay said data from said sync transmitting circuit and a data unidentifying time detecting circuit configured to receive an output of said first variable delay circuit, adjust a delay amount of said first variable delay circuit, and generate reception data synchronized with said clock, and said data unidentifying time detecting circuit includes a second variable delay circuit configured to delay the output of said first variable delay circuit, a third variable delay circuit configured to delay an output of said second variable delay circuit, a reception data fetching circuit configured to fetch the output of said second variable delay circuit synchronously with the clock and generating as said reception data, and a timing determining circuit configured to fetch output data of said first variable delay circuit and said third variable delay circuit synchronously with said clock, determine whether said fetched output data coincides with said reception data and adjust the delay amounts of said first to third variable delay circuits in accordance with the determining result.

22. An apparatus according to claim 21, wherein said transmitting unit includes an adjustment data generating circuit configured to transmit specific data to said receiving unit in the adjusting operation, and said receiving unit includes a circuit configured to set and hold control information to adjust the delay amounts of the first, second, and third variable delay circuits in response to an input of said specific data from said transmitting unit.

23. An apparatus according to claim 21, wherein while said timing determining circuit transfers arbitrary data in the normal operation, said receiving unit adjusts the delay amount of said first, second, or third variable delay circuits.

* * * * *